(12) United States Patent
Hojjati

(10) Patent No.: US 7,342,055 B2
(45) Date of Patent: Mar. 11, 2008

(54) LITHOGRAPHIC INK OBVIATING FOUNTAIN ADDITIVES

(75) Inventor: Seyed H. Hojjati, Ann Arbor, MI (US)

(73) Assignee: Flint Group, Plymouth, MI (US)

( * ) Notice: Subject to any disclaimer, the term of this patent is extended or adjusted under 35 U.S.C. 154(b) by 405 days.

(21) Appl. No.: 10/932,851

(22) Filed: Sep. 2, 2004

(65) Prior Publication Data

US 2005/0051043 A1    Mar. 10, 2005

Related U.S. Application Data

(60) Provisional application No. 60/501,330, filed on Sep. 9, 2003.

(51) Int. Cl.
*C09D 11/00*    (2006.01)
(52) U.S. Cl. ...................... 523/160; 523/161
(58) Field of Classification Search ................ 523/160, 523/161

See application file for complete search history.

(56) References Cited

U.S. PATENT DOCUMENTS

| | | | |
|---|---|---|---|
| 2,843,040 A * | 7/1958 | Childers | ..................... 101/141 |
| 4,981,517 A * | 1/1991 | DeSanto, Jr. et al. | .... 106/31.25 |
| 5,158,606 A * | 10/1992 | Carlick et al. | ............... 524/145 |
| 6,025,022 A * | 2/2000 | Matzinger | .................... 427/256 |
| 6,140,392 A | 10/2000 | Kingman et al. | |
| 6,312,873 B1 | 11/2001 | Matsumoto et al. | |
| 6,436,176 B1 | 8/2002 | Van Hunsel et al. | |
| 6,494,943 B1 * | 12/2002 | Yu et al. | .................. 106/31.65 |
| 6,513,434 B1 * | 2/2003 | Nakazawa et al. | .......... 101/466 |
| 2004/0097615 A1 * | 5/2004 | Reem et al. | ................. 523/160 |

FOREIGN PATENT DOCUMENTS

JP          62236875       10/1987
WO     WO 03/011988 A1    2/2003

\* cited by examiner

*Primary Examiner*—Edward J. Cain
(74) *Attorney, Agent, or Firm*—Harness, Dickey & Pierce, P.L.C.

(57) ABSTRACT

A lithographic ink comprises an acid-functional styrenic copolymer and an acid. In one embodiment, the ink contains the copolymer and acid in amounts effective to allow the ink to print lithographically with a fountain containing essentially water. A lithographic printing system comprises a printing press with an ink reservoir containing this ink and a fountain containing essentially only water. The ink is printed lithographically using essentially only water from the fountain. In another embodiment, the lithographic printing system comprises a fountain containing a fountain solution or water and one or more lithographic fountain additives, and the ink is printed using the fountain solution or the water and one or more lithographic fountain additives.

10 Claims, No Drawings

LITHOGRAPHIC INK OBVIATING FOUNTAIN ADDITIVES

This application is a continuation of U.S. Provisional Patent Application 60/501,330, filed Sep. 9, 2003.

FIELD OF THE INVENTION

The present invention relates to lithographic printing inks and lithographic printing methods and to fountain solutions and other materials used in such printing methods

BACKGROUND OF THE INVENTION

In lithographic printing, an inked printing plate contacts and transfers an inked image to a rubber blanket, and then the blanket contacts and transfers the image to the substrate being printed. Lithographic plates have image areas with a relatively oleophilic surface and non-image areas with a relatively hydrophilic surface. In a typical two-fluid lithographic printing process, the plate cylinder first comes in contact with dampening rollers that transfer an aqueous fountain solution that wets out the hydrophilic non-image areas of the plate. The dampened plate then contacts an inking roller, accepting ink only in the oleophilic image areas. The fountain solution helps to keep the ink out of the non-image areas. The press operator must continually monitor the printing process to insure that the correct balance of the fountain solution and the ink is maintained so that the ink adheres to the image areas, but only the image areas, of the plate in order to produce a sharp, well-defined print.

A conventional aqueous fountain solution contains a number of components to enhance performance of the water on the plate. First, the fountain solution includes a plate desensitizer to increase ink repellency from the non-image area. Examples of conventional desensitizers are gum arabic, hydroxypropyl cellulose, and carboxymethyl cellulose. The fountain solution also typically includes a pH buffer. Other common fountain solution components include wetting agents such as isopropanol, glycol ethers, and other water-miscible organic solvents, corrosion inhibitors, fungicides, and antifoaming agents.

The fountain solution is prepared by adding a concentrate containing the desensitizer, wetting agents, and other components to water, generally R.O. or D.I. water. Preparing a fountain solution adds to the expense and preparation time for a printing process. Further, care must be taken to combine the concentrate and water in the right proportions to make an effective fountain solution. In addition, the organic solvents, e.g. wetting agents, in the fountain solution produce unwanted organic emissions.

Van Hunsel et al., U.S. Pat. No. 6,436,176 describes a dampening solution that includes a treated silica sol, water-soluble organic solvents such as alcohols, ethers, polyglycols, and esters, a pH between 3 and 6 obtained with a phosphate salt as buffer, citrate ions, surfactants, thickening agents, preservatives, and chelate compounds.

Matsumoto et al., U.S. Pat. No. 6,312,873 teaches that a fountain solution containing only an aqueous solution of an alkali metal salt of bichromic acid or phosphoric acid or salt or gum arabic were difficult to uniformly wet the non-image area. To overcome this problem, 20-25% isopropanol is added. Isopropanol, however, evaporates too quickly from the fountain and has an odor, and the Matsumoto '873 patent proposes a block copolymer of polypropylene oxide and polyethylene oxide as a replacement.

The industry thus continues to struggle to overcome the problems associated with making and maintaining a complicated fountain solution composition to avoid toning.

SUMMARY OF THE INVENTION

The present invention provides a method of lithographic printing capable of using water, especially tap water, alone in the fountain without added organic materials in the fountain. The method uses a lithographic ink of the invention that includes an effective amount of (a) an acid-functional styrenic copolymer and (b) an acid. An "effective amount" is an amount that allows the ink to print lithographically using essentially only water in the fountain. The acid and acid-functional styrenic copolymer are substantially uniformly mixed in the ink.

In one aspect of the invention, the lithographic ink comprises an effective amount of phosphoric acid, especially from about 0.1 to about 1.5% by weight phosphoric acid, and an effective amount of a copolymer of styrene, a comonomer having an acid group, and optionally other comonomers, especially from about 0.2 to about 2.5% by weight of the copolymer.

The lithographic printing system of the invention comprises a lithographic printing press having an ink reservoir and a water reservoir (fountain). The ink reservoir contains an ink composition including an effective amount of (a) an acid-functional styrenic copolymer and (b) an acid. The water reservoir contains only water or essentially only water, preferably tap water. The water reservoir does not need, and preferably does not include, any organic compounds.

The lithographic printing method of the invention involves lithographic printing with a lithographic printing press and a lithographic plate having oleophilic image areas and hydrophilic non-image areas. Water essentially free of organic materials and an ink including an effective amount of (a) an acid-functional styrenic copolymer and (b) an acid are applied to the plate. The inked image is transferred from the plate to the blanket of the press and from the blanket to a printing substrate.

The present invention eliminates the need to include volatile organic solvents or gum or other plate sensitizers in the water reservoir, as well as other additives that have been added in the fountain. Further, the lithographic inks of the invention dry faster and/or at a lower temperature compared to inks printed with a fountain solution containing hydrophilic organic solvents.

In another aspect of the invention, the lithographic printing system of the invention again comprises a lithographic printing press having an ink reservoir containing an ink composition including (a) an acid-functional styrenic copolymer and (b) an acid and a water reservoir. In this embodiment, the water reservoir contains a conventional fountain solution or at least one fountain additive for lithographic printing. The presence of the acid-functional styrenic copolymer and acid in the ink allows a greater latitude with the fountain water. Thus, the ink can be printed without toning even if the fountain solution is improperly mixed (e.g., not enough fountain concentrate has been added to the fountain) or if only one or part of the typical fountain additives are added to the fountain water. For instance, the fountain water may not include a plate desensitizer and preferably does not include a volatile organic compound, but one or more of additives such as a pH buffer, corrosion inhibitors, fungicides, and antifoaming agents may be added to the fountain water. The ink still contains the acid-functional styrenic copolymer and the acid, but a smaller amount may be effective for printing without toning if used with a fountain solution.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The lithographic ink of the invention includes an effective amount of (a) an acid-functional styrenic copolymer and (b) an acid.

The copolymer included in the ink contains both styrene monomer units and monomer units having pendant acid groups, preferably carboxylic acid groups. The copolymer may have other comonomer units, too, and such comonomers should be carefully selected to not interfere with the styrenic copolymer function in the ink during printing of the ink. Preferably, the copolymer essentially comprises monomer units from the acid-bearing monomer and styrene and/or other styrenic comonomers such as α-methyl styrene, 4-tert-butyl styrene, α,2-dimethyl styrene, 2,4-dimethyl styrene, 2,5-dimethyl styrene, 4-ethyl styrene, 2-ethyl styrene, 4-isopropyl styrene, 2-methyl styrene, 3-methyl styrene, 4-methyl styrene, 4-phenyl styrene, and combinations of these.

The ink containing the copolymer preferably has an overall acid number in the range from about 8 to about 25 for optimum lithographic printing and cure characteristics for inks that dry oxidatively, or by heat or radiation (e.g., UV radiation or electron beams). While the acid groups of the acid-functional styrenic copolymer are preferably carboxylic acid groups, the acid groups may also be sulfonic acid groups, hydrogen phosphate groups, phosphonic acid groups, or combinations of these with themselves or with carboxylic acid groups. Preferably, the acid groups are salted, preferably with sodium. Examples of suitable monomers for providing such acid groups are acrylic acid, methacrylic acid, crotonic acid, α,β-ethylenically unsaturated dicarboxylic acids containing 4 to 6 carbon atoms and the anhydrides and monoesters those acids such as maleic anhydride, maleic acid monomethyl ester, and fumaric acid, 4-carboxy styrene, sodium styrene sulfonate, sodium 2-sulfoethyl methacrylate, sodium vinyl sulfonate, sodium 2-acrylamido-2-methyl propane sulfonate, vinyl hydrogen phosphate, vinyl phosphonic acid, monoesters of vinyl phosphonic acid, and combinations of these. Acid functionality could also be supplied by polymerization of acid-functional derivatives of copolymerizable monomers, such as the hydroxyethyl acrylate half-ester of succinic acid, or by converting functionality on a monomer unit to acid functionality following polymerization, as by hydrolyzing an anhydride group or reacting an hydroxyl group with an acid anhydride.

The copolymer may be made by any addition copolymerization method, including emulsion polymerization, semi-batch free-radical polymerization in solution, free-radical polymerization in bulk, and so on.

Following polymerization, the acid group may be salted, if not already salted. Preferably, a sodium salt of the acid is formed. Other salts may be formed, e.g. potassium salts, but ammonium salts are not preferred because of the odor ammonia imparts.

An effective amount of the acid-functional styrenic copolymer is added to the ink. If not enough of acid-functional styrenic copolymer is added to the ink the plate will scum; more of the acid-functional styrenic copolymer will need to be added to keep the plate clean. If too much of the acid-functional styrenic copolymer is added to the ink the color strength of the ink may be diluted by the unpigmented acid-functional styrenic copolymer (and other varnishes that may come in with the copolymer as part of an additive package). If too much of the acid-functional styrenic copolymer is added the lithographic ink may also emulsify too much water and the ink will not properly wet out all of the image areas of the plate. The amount of acid-functional styrenic copolymer needed will depend, among other factors, whether the fountain contains water alone or water with other additives and the nature and amount of those additives. The lithographic ink preferably includes at least about 0.1% by weight of the acid-functional styrenic copolymer, based on the total weight of the finished ink. The lithographic ink preferably includes up to about 2.5% by weight of the acid-functional styrenic copolymer, based on the total weight of the finished ink. In a preferred embodiment, the ink includes from about 0.1 to about 2% by weight of the acid-functional styrenic copolymer, based on the total weight of the ink. More preferably, the ink includes from about 0.25 to about 1.0% by weight of the acid-functional styrenic copolymer, based on the total weight of the ink.

The lithographic ink also includes an effective amount of an acid, including acid derivatives that retain some acid functionality or have acid functionality when used in the lithographic printing process. The acid may be any mineral acid or organic acid. Examples of suitable acids include, without limitation, nitric acid, sulfuric acid, phosphoric acid, metaphosphoric acid, citric acid, acetic acid, oxalic acid, malonic acid, p-toluenesulfonic acid, tartaric acid, malic acid, lactic acid, levulinic acid, phytic acid, organic phosphonic acid, triflic acid, partial esters of these that retain some acid functionality such as isoamyl acid phosphate and oxalic acid mono acetate, and combinations thereof. Phosphoric acid is one particularly preferred acid.

An effective amount of the acid is added to the ink. If not enough acid is added to the ink, the ink will adhere to the steel or ceramic water pan roller, be transferred to the from rollers and from there to the plate and in turn to the blanket and substrate. If too much acid is added to the ink, the acid will "blind" the plate by making the image area hydrophilic as well as the non-image area. The amount of acid needed in the ink will depend upon the acid strength and upon the concentration of the acid being added, as well as on whether the fountain contains water alone or water with other additives and the nature and amount of those additives. The lithographic ink preferably includes at least about 0.3% by weight of the acid, based on the total weight of the finished ink. The lithographic ink preferably includes up to about 2.5% by weight of the acid, based on the total weight of the finished ink. In a preferred embodiment, the ink includes from about 0.3 to about 1.5% by weight of the acid, based on the total weight of the ink. More preferably, the ink includes from about 0.3 to about 0.5% by weight of the acid, based on the total weight of the ink.

The lithographic ink composition in which the acid-functional styrenic copolymer and acid are included can be any conventional or suitable lithographic ink, including black and process color lithographic inks, pantone color or other special color lithographic inks, magnetic lithographic inks, and energy curable (e.g., EB and UV radiation curable) lithographic inks.

In general, the lithographic inks contain, in a homogenous mixture, a resin or polymer, a solvent, and a colorant (preferably a pigment). Examples of suitable lithographic ink resins and polymers include, without limitation, polyester and alkyd resins, phenolic resins, rosins, cellulosics, and derivatives of these such as rosin-modified phenolics, phenolic-modified rosins, hydrocarbon-modified rosins, maleic modified rosin, fumaric modified rosins; hydrocarbon resins, oleophilic acrylic or vinyl resins, polyamide resins, and so on. Suitable lithographic inks typically include such resins and polymers in amounts of from about 10 percent by weight up to about 50 percent by weight, preferably from about 20 to about 35 percent by weight, based upon the nonvolatile weight of the ink composition. In one embodiment, the lithographic ink includes one or more resins selected from rosin phenolic resoles, addition products of rosin phenolic resoles with unsaturated acids, and esters and partial esters of these, preferably with polyols, especially glycerol or pentaerythritol; rosin esters of polyols, including ethylene glycol, oligomers of ethylene glycol (diethylene glycol, triethylene glycol, etc.), glycerol, pentaerythritol, and trimethylolpropane; addition products of rosin and unsaturated acids (e.g., maleic, fumaric, acrylic acids) and esters and partial esters of these with the polyols already mentioned; phenol formaldehyde condensation products, including resoles, condensation products of phenol formaldehyde and rosins including rosin phenolic resoles, addition products of these with unsaturated acids such as maleic acid and esters of these, particularly with polyols; alkyds, such as linseed oil alkyds; condensation products of polyepoxides and rosins or of the modified rosin materials already mentioned.

Energy curing lithographic inks generally contain an amount of a prepolymer or oligomer having one or more polymerizable groups that react when exposed to ultraviolet or electron beam radiation. Energy curing lithographic inks preferably further include polymerizable monomers in an appropriate amount to attain the desired ink viscosity. Such monomers may, of course, be monofunctional or polyfunctional, and preferably difunctional, trifunctional, and/or tetrafunctional monomers are included. Energy curing lithographic inks may further include appropriate photoinitiators. A substantial number of patents and other literature in the art describes energy curing inks in further detail. The acid and acid-functional styrenic copolymer may be added as described herein to such inks to produce energy curing lithographic inks according to this invention that may be printed using water alone, that is, without a fountain solution containing various organic materials.

The preferred ink compositions include one or more organic solvents. The particular organic solvents and amount of solvent included is determined by the ink viscosity, body, and tack desired. In general, non-oxygenated solvents or solvents with low Kauri-butanol (KB) values are used to avoid affecting the rubber parts such as rubber rollers when the ink contacts those parts during the lithographic printing process. Suitable solvents for inks that will contact rubber parts include, without limitation, aliphatic hydrocarbons such as petroleum distillate fractions and normal and iso-paraffinic solvents with limited aromatic character. For example, petroleum middle distillate fractions such as those available under the trademark Magie Sol, available from Magie Bros. Oil Company, a subsidiary of Pennsylvania Refining Company, Franklin Park, Ill., under the trademark ExxPrint, available from Exxon Chemical Co., Houston, Tex., and from Golden Bear Oil Specialties, Oildale, Calif., Total Petroleum Inc., Denver, Colo., and Calumet Lubricants Co., Indianapolis, Ind. may be used. In addition or alternatively, soybean oil or other vegetable oils may be included.

Preferably, the organic solvent or solvent mixture will have a boiling point of at least about 100° C. and preferably not more than about 550° C. Lithographic printing inks may use solvents with boiling point above about 200° C. News inks usually are formulated with from about 20 to about 85 percent by weight of solvents such as mineral oils, vegetable oils, and high boiling petroleum distillates. The amount of solvent also varies according to the type of ink composition (that is, whether the ink is for newsprint, heatset, sheeffed, etc.), the specific solvents used, and other factors known in the art. Typically the solvent content for lithographic inks is up to about 60%, which may include oils as part of the solvent package. Usually, at least about 35% solvent is present in lithographic ink.

The ink compositions will usually include one or more pigments as colorants. The number and kinds of pigments will depend upon the kind of ink being formulated. News ink, cold set, and book black compositions typically will include only one or only a few pigments, such as carbon black, while custom color inks may include a more complicated pigment package, including colors with special effects such as pearlescence or metallic effect. Lithographic printing inks for full-color printing typically use the four process colors—magenta, yellow, black, and cyan—and custom colors may be included as desired. Any of the customary inorganic and organic pigments may be used in the ink compositions of the present invention.

It will be appreciated by the skilled artisan that other additives known in the art may be included in the ink compositions, so long as such additives do not significantly detract from the benefits of the present invention. Illustrative examples of other additives include, without limitation, pour point depressants, surfactants, wetting agents, waxes, emulsifying agents and dispersing agents, defoamers, antioxidants, UV absorbers, dryers (e.g., for formulations containing vegetable oils), photoinitiators (for UV curing formulations), flow agents and other rheology modifiers, gloss enhancers, and anti-settling agents. When included, additives are typically included in amounts of at least about 0.001% of the ink composition, and may be included in amount of about 7% by weight or more of the ink composition.

The lithographic applications include, without limitation, heatset printing, news ink printing, sheeffed printing, and processes in which an energy curable lithographic ink is printed onto a substrate and cured.

The acid may be incorporated into the ink by first combining the acid with a varnish carrier and/or water. Because the amount of acid needed in the ink is small, diluting the acid in the varnish and/or water to make an acid additive composition can make it easier to control the amount of acid that is added to the ink. The varnish used as the carrier in the acid additive composition may be any resin or polymer compatible with the ink composition to which the acid additive composition is to be added. In general, resins and polymers such as those mentioned above as suitable lithographic ink resins and polymers may be used. The varnish may include a solvent, which solvent may be water-miscible. In one embodiment, the acid is diluted in water in a ratio of 0.2 to 5.0 parts by weight water for each part by weight acid and alkyd resin in a ratio of 0.5 to 10.0 parts by weight alkyd for each part by weight acid.

The acid-functional styrenic copolymer may also be diluted before being added to the ink, particularly if the copolymer is prepared without solvent or at a high concentration in a solvent. In one embodiment, the acid-functional styrenic copolymer is prepared as an aqueous emulsion or is emulsified in an aqueous medium. In one embodiment, the acid-functional styrenic copolymer may be added as a solution or emulsion containing from about 10% to about 70% by weight of the acid-functional styrenic copolymer. In a preferred embodiment the acid-functional styrenic copolymer is added as an aqueous emulsion containing from about 30% to about 60% by weight of the acid-functional styrenic copolymer.

An additive package containing both the acid and the acid-functional styrenic copolymer may be prepared by adding the acid, or acid additive prepared as outlined above, and the acid-functional styrenic copolymer emulsion or solution as just described, optionally along with one or more varnishes. An additive package would be prepared to make it easier to control the amount of the acid and acid-functional styrenic copolymer introduced into the lithographic ink. The additive package may then be added to the lithographic ink in an appropriate amount to provide the desired concentrations of the acid and acid-functional styrenic copolymer in the ink.

The lithographic printing system of the invention comprises a printing press having an ink reservoir and a water reservoir, also called a fountain. The ink reservoir contains the ink including the acid and the acid-functional styrenic copolymer. The water reservoir contains only water or essentially only water, preferably tap water. No materials need to be added to the water, and preferably no organic materials are in the fountain water. The water may have a conductivity in a wide range, for instance from 0 (deionized water) to 2000 micromhos. The lithographic ink of the invention may, in one embodiment, be used with a conventional fountain solution, keeping the plate clean even when the fountain solution is not made with the prescribed amount of fount concentrate, or if only certain additives such as pH buffers and biocides are added. If the conductivity is very low, below about 200 micromhos, the amount of water on press may need to be increased slightly to keep the plate clean.

In the lithographic printing method of the invention, water is applied to a lithographic printing plate from fountain rollers, then ink is applied to the plate from ink rollers. The water is preferably essentially free of organic materials. The ink contains effective amounts of an acid and an acid-functional styrenic copolymer so that the ink only wets out image areas of the printing plate and the plate does not scum. The inked plate is then contacted with a blanket roller, which receives the inked image. The inked image is then transferred to a substrate, such as paper, to produce a printed image.

The invention is illustrated by the following example. The example is merely illustrative and does not in any way limit the scope of the invention as described and claimed. All parts are parts by weight unless otherwise noted.

EXAMPLE

A lithographic ink of the invention was prepared by combining 90 parts by weight of each of the cyan, magenta, yellow, and black inks of the ARROWMAX 1000 Process Colors (available from Flint Ink Corp., Ann Arbor, Mich.) with 10 parts by weight of the following mixture:

| | |
|---|---|
| 10 parts by weight | Joncryl 1175 (a 47.5% by weight nonvolatiles, aqueous emulsion of a sodium salt of an acid-functional modified styrene acrylic polymer), |
| 10 parts by weight | of a mixture of 20 weight percent water, 25 weight percent phosphoric acid, and 55 weight percent of a linseed oil alkyd resin, and |
| 80 parts by weight | of a mixture of modified phenolic maleic quickset varnishes (about 45% by weight nonvolatiles in Exx-print 588D). |

The lithographic ink set prepared was introduced to the respective ink reservoirs of a MAN Roland R306 lithographic printing press+coater. The fountain reservoir was filled with tap water having a conductivity of 220 micromhos, a pH of 7.77, and a temperature of 15° C. Impressions were produced at a press room temperature of 74° F. and 64% humidity, impression setting of 0.10 to 0.12 mm, and press production speed to 10,000 to 15,000 sheets per hours over both 1.8-pound Porcelean Gloss and 2.1-pound Fortune Gloss, using Fuji LHPI plates. Target densities were set to 1.70 for black, 1.40 for cyan, 1.50 for magenta and 1.05 for yellow.

A first run was performed to test ink/water balance for a high percent-image coverage, four-color process job. A test form with heavy coverage of all four colors was chosen and made ready with the prepared inks. A profile from a CIPP 3 file was used. Register and color was achieved within 400 sheets. A base speed of 10 for the dampening roller was set for all units, with a characteristic curve value of 1.5%. A total 4000 sheets were run at a speed of 10,000 sheets per hour, with regular production interruption to observe start up. All inks showed no toning on the start ups. When the machine speed was increased to 15,000 sheets per hour, the damp settings were increased to prevent toning. The final damp settings after finishing were between 48% and 65% for the units. The total value increases (TVls) were 69% to 70% on all colors, showing balanced printing. A total of 5000 sheets were printed with excellent print quality, grey balance, consistent color, and meeting TVI targets. The test indicated that the characteristic curve of the dampening unit should be increased to 2.5% to apply more water automatically when press speed is increasing.

A second run was performed to observe printing with a job having 95-100% image. A plate for single color test of a solid and reversed out type with boxes was mounted on the cyan unit. A profile from CIPP 3 was again used. Density was hit within 350 sheets and the water setting leveled out at 53%. Again, the print quality for the solid was excellent, with consistent color.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lithographic ink, comprising
  (a) an acid-functional styrenic copolymer,
  (b) an acid, and a resin or polymer other than the acid-functional styrenic copolymer, an organic, non-oxygenated solvent or solvent with low Kauri-butanol value, and a colorant, wherein the lithographic ink is a homogenous mixture.

2. A lithographic ink according to claim 1, wherein in the acid-functional styrenic copolymer and the acid are included in amounts effective to allow the ink to print lithographically with a fountain consisting essentially of water.

3. A lithographic ink, comprising
   (a) from about 0.1 to about 1.5% by weight phosphoric acid and
   (b) from about 0.2 to about 2.5% by weight of an acid-functional styrenic copolymer,
   wherein the lithographic ink is a homogenous mixture.

4. A lithographic printing system comprising a lithographic printing press comprising an ink reservoir and a fountain, wherein the contents of said fountain consist essentially of water and said ink reservoir contains an ink comprising an acid-functional styrenic copolymer and an acid.

5. A lithographic printing system according to claim 4, wherein the contents of said fountain are free of volatile organic compounds.

6. A method of lithographic printing, comprising steps of:
   applying to a lithographic printing plate water,
   applying to the plate a lithographic ink comprising an acid-functional styrenic copolymer and an acid to produce an inked image,
   transferring the inked image to a blanket,
   transferring the inked image on the blanket to a substrate to produce a printed image on the substrate.

7. A method according to claim 6, wherein the acid comprises phosphoric acid.

8. A method according to claim 6, wherein the ink comprises from about 0.2 to about 2.5% b weight of the acid-functional styrenic copolymer.

9. A lithographic ink according to claim 1, wherein the solvent comprises a member selected from the group consisting of non-oxygenated solvents and solvents with low Kauri-butanol values.

10. A lithographic ink according to claim 1, wherein the solvent comprises an aliphatic hydrocarbon.

* * * * *

UNITED STATES PATENT AND TRADEMARK OFFICE
CERTIFICATE OF CORRECTION

| | |
|---|---|
| PATENT NO. | : 7,342,055 B2 |
| APPLICATION NO. | : 10/932851 |
| DATED | : March 11, 2008 |
| INVENTOR(S) | : Seyed H. Hojjati |

It is certified that error appears in the above-identified patent and that said Letters Patent is hereby corrected as shown below:

<u>Column 6,</u>
Line 21, "sheeffed" should be --sheetfed--.
Line 56, "sheeffed" should be --sheetfed--.

<u>Column 10,</u>
Line 13, Claim 8, "b weight" should be --be weight--.

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,342,055 B2  Page 1 of 1
APPLICATION NO. : 10/932851
DATED : March 11, 2008
INVENTOR(S) : Seyed H. Hojjati It is certified that error appears in the above-identified patent and that said Letters Patent is hereby corrected as shown below:

<u>Column 6,</u>
Line 21, "sheeffed" should be --sheetfed--.
Line 56, "sheeffed" should be --sheetfed--.

<u>Column 10,</u>
Line 13, Claim 8, "b weight" should be --by weight--.

This certificate supersedes the Certificate of Correction issued November 11, 2008.

Signed and Sealed this

Tenth Day of November, 2009

David J. Kappos
*Director of the United States Patent and Trademark Office*